March 30, 1948.  J. J. SANDRIK  2,438,792
HAND GUARD FOR WELDING APPARATUS
Filed May 4, 1946  2 Sheets-Sheet 1
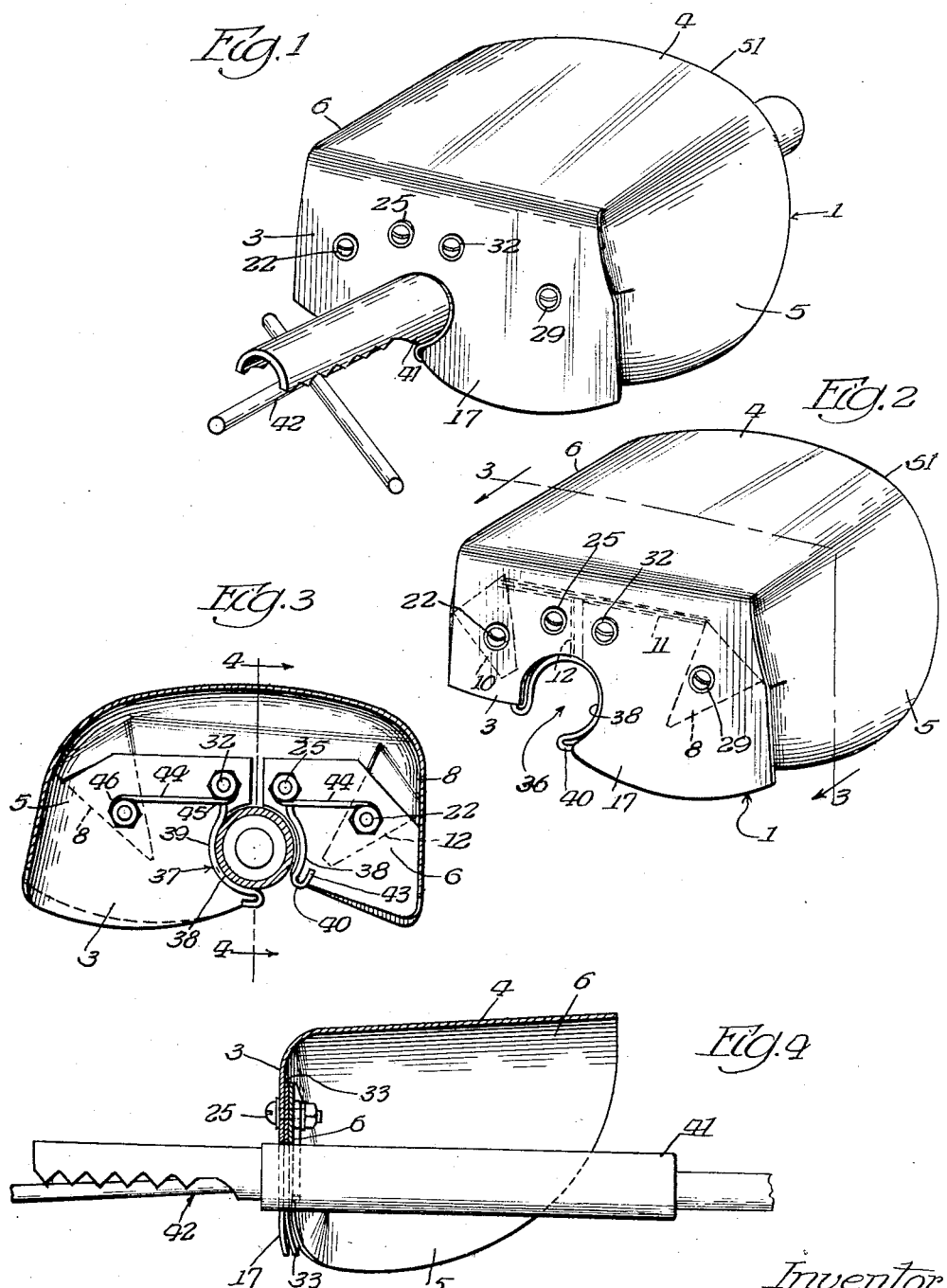
Inventor
John J. Sandrik
By:- Spencer, Marzall, Johnston & Cook
attys.

March 30, 1948. J. J. SANDRIK 2,438,792
HAND GUARD FOR WELDING APPARATUS
Filed May 4, 1946 2 Sheets-Sheet 2
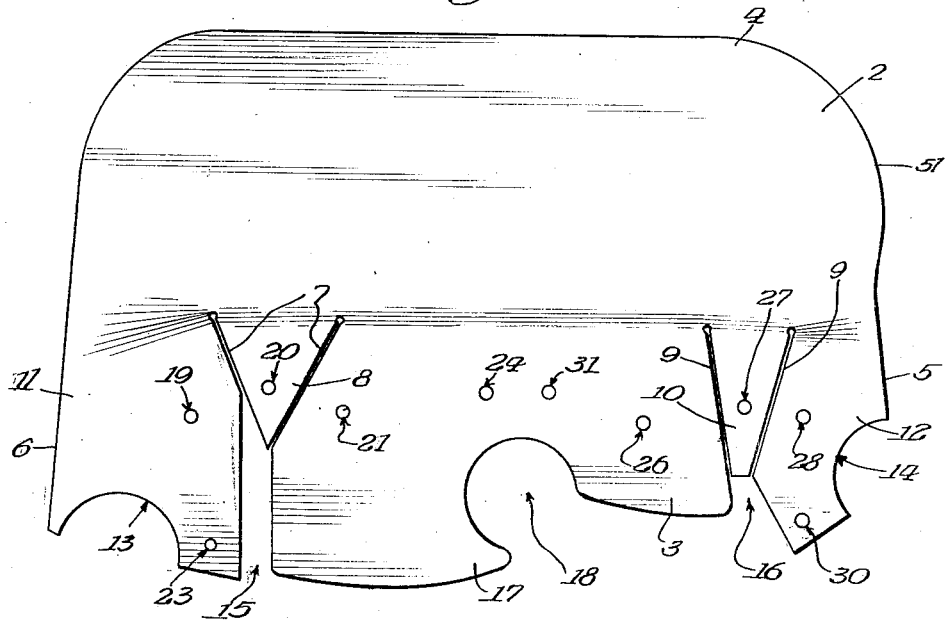
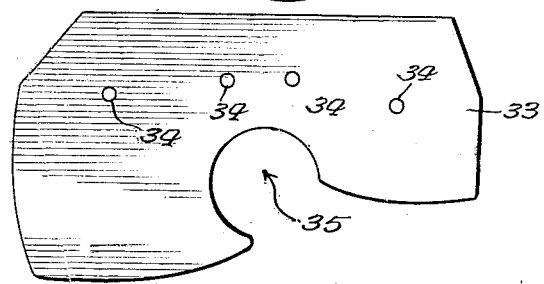
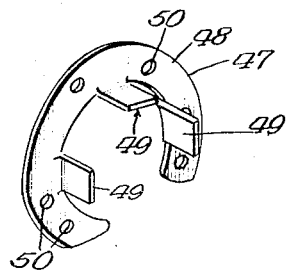
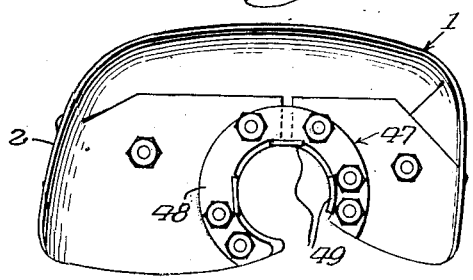
Inventor
John J. Sandrik
By: Spencer, Marzall, Johnston & Cook
Attys Patented Mar. 30, 1948

2,438,792

UNITED STATES PATENT OFFICE 2,438,792

HAND GUARD FOR WELDING APPARATUS

John J. Sandrik, Chicago, Ill.

Application May 4, 1946, Serial No. 667,440

5 Claims. (Cl. 2—17)

This invention relates to a hand guard or protector for shielding the hand of a person whose occupation requires that he be relatively close to extreme heat such as during a welding operation. More specifically, the invention relates to a hand guard or shield for use in connection with welding apparatus so that the splatter, sparks and hot metal, caused by the use of welding apparatus, will not come into contact with the welder's hand.

An important object of the present invention is the provision of a new and novel hand guard, shield or protector constructed and arranged in a particular manner so that when applied to the handle of a welding apparatus the operator's hand is free to control the operating valves of the welding apparatus but at the same time is properly protected.

Another important object of the invention is the provision of a new and novel hand shield or protector which is preferably made from a single piece of heat insulating material, particularly of a fibrous nature, whereby the flat piece of material, after being cut along certain preferred lines, is bent or forced into shape and then locked into the proper shape in any suitable manner such as by metal stitching, riveting or otherwise.

A further object of the invention resides in the particular shape, location and arrangement of the parts, the parts being so constructed that when arranged in the preferred form they will shield properly the operator's hand, there being new and improved means to mount detachably the guard or shield on the handle portion of a welding apparatus.

Still another object of the invention resides in the formation, construction and arrangement of the parts so as to form in effect a gauntlet type shield or protector, inclining or flaring outwardly and upwardly from front to rear with a complete opening beneath the top shield portion so as to permit the operator to have full use of his hand and at the same time protect the hand against splatter, arcs and parts of hot metal, the shield or protector having secured thereto a new and improved locking means for locking detachably the shield or protector to the handle or other part of a welding apparatus.

Numerous other objects and advantages will be apparent throughout the progress of the following specification.

The accompanying drawings illustrate a selected embodiment of the invention and the views therein are as follows:

Fig. 1 is a detail perspective view of the improved protector, guard or shield, the same being shown applied to the handle of a welding apparatus of conventional design.

Fig. 2 is a detail perspective view of the improved protector, guard or shield, and embodying the invention, the same having applied thereto a spring clip arrangement for fastening detachably the device to the handle of a welding apparatus of conventional design.

Fig. 3 is a detail transverse sectional view on the line 3—3 of Fig. 2.

Fig. 4 is a detail transverse sectional view on the line 4—4 of Fig. 3.

Fig. 5 is a detail view of a blank from which the shield is made, the blank being configurated and cut along certain lines and adapted to be folded to the forms disclosed in Figs. 1 to 4.

Fig. 6 is an end reinforcing portion which is adapted to co-operate with the blank shown in Fig. 5 for the purpose of reinforcing the forward end of the shield as shown more clearly in Fig. 4.

Fig. 7 is a detail perspective view of another form of attaching clip which may be used in conjunction with the guard or shield.

Fig. 8 is a view similar to Fig. 3 but showing the attaching clip, Fig. 7, applied on an inner wall of the shield or guard shown in Figs. 1 and 2.

The particular shield 1, guard or protector herein shown for the purpose of illustrating the invention is preferably made from a blank 2, Fig. 5, cut or stamped from a single sheet of insulating or fire resisting material.

The shield 1, Figs. 1 to 3, is in the form of a gauntlet having a relatively straight front part 3 from which there extends a top portion 4 and side parts or elements 5 and 6. The part or side 5 extends downwardly a predetermined distance beyond the lower edge of the part 6 so as to protect that part of the operator's hand which is closest to the heat, and which is adapted to be moved for operating the control lever or switch of the welding apparatus.

The blank 2, Fig. 5, is cut to the desired shape and configuration, being slit along the lines 7, Fig. 5, to provide a relatively triangular part 8. The blank 2 is also slit along the lines 9 to provide a relatively triangular portion 10. The parts 11 and 12, lying outwardly of the triangular parts 8 and 10, are provided with circular cutouts 13 and 14, respectively. The parts 11 and 12 are separated from the other parts by cutouts 15 and 16, respectively, providing a central portion 17 of the front 3. The part 17 is provided with a substantially circular cutout 18 which cooperates with the arcuate cutout parts 13 and 14 when the device is folded. The parts 11, 8 and 17 are provided with fastener receiving openings 19, 20 and 21, respectively, which are adapted to be brought into registering alignment to receive locking fasteners 22 to lock the parts in assembled relationship. The triangular part 8 is adapted to be arranged between the parts 11 and 17 with the part 17 extending exteriorly and forming the end wall 3. The fastening means 22, which may be metal stitching or rivets as shown, locks the parts together and brings the arcuate cutout 13 into registration with an edge of the arcuate cutout 18, Fig. 5. The part 11 of the blank 2 is also provided with a fastener receiving opening 23, Fig. 5, which during the folding operation is brought into registration with a fastening receiving opening 24. Fastening means 25, Fig. 2, pass through the aligned openings 23 and 24 to lock the parts in assembled relations whereby the one side of the shield is formed, as clearly shown in Fig. 2. The opposite side of the blank 2, Fig. 5, is adapted to be folded or bent so that fastening receiving openings 26, 27, and 28 in the parts 17, 10 and 12, respectively, are brought into alignment. Fastening means 29, Fig. 2, pass through the holes 26, 27 and 28 when they are brought into alignment to lock the parts together. The triangular portion 10 lies between the parts 12 and 17 when the parts are folded or bent to shape. This latter folding arrangement brings the arcuate portion 14 of the part 12 into peripheral arcuate registration with the opening 18 in the part 17. The part 12 of the blank 2 is also provided with a fastener receiving opening 30, which is adapted to be brought into registration with a fastening receiving opening 31 in the part 17. Fasteners 32, such as rivets, pass through the aligned openings or holes 30 and 31 to lock the parts together, Fig. 2.

A reinforcing part 33, Fig. 6, which has a configuration substantially the same as the inside of the front end wall 3 is adapted to be arranged against the inside of the front wall 3 so as to reinforce the device and to provide an extra thickness of insulating or heat resisting material. The reinforcing member 33 also tends to hold the parts in assembled relationship so that they will assume their proper shape. The member 33 is provided with fastening receiving holes 34 through which the fastening means 22, 25, 32 and 29 pass. This reinforcing member 33 is also provided with an arcuate cutout 35 which is adapted to cooperate with the cutout 18 so as to leave an arcuate opening 36, Fig. 2, in the end wall 3 of the device.

The spring clip 37, Fig. 3, is adapted to be arranged on the inner face of the front wall 3 and comprises a pair of oppositely disposed spring clip members 38, 38. These spring clips 38, 38 each have an arcuate body portion 39 with a radius substantially the same as the opening 36, but have their spring ends 40 extending inwardly of the opening 36 a predetermined distance so that they will spring apart to permit the shield or guard 1 to be slipped over the handle 41 of a part of a welding device 42. The spring clips 38, 38 preferably have their ends turned over as indicated at 43, Fig. 3. The clips 38, 38 may each be made from a single piece of wire and include an integral leg 44. Each leg 44 may be provided with an intermediate loop 45 and an end loop 46, the fastening means 22 and 25 securing one clip 38 in position and the other fastening means 32 and 29 securing the other clip in position. The clips are spaced apart so as to be easily spread apart, but are made from resilient material so that they will first spring apart when being applied over the handle 41 and then press inwardly to lock the device securely to the handle 41.

In some conventional apparatus, the guard may be slipped over the handle instead of clamping it on. In cases where the device is to be slipped over the handle 41 of the welding apparatus, a clip construction 47, as shown in Fig. 7, may be employed.

The clip 47 comprises a body 48 in the form of a flat circular ring. The ring 48 is made of resilient material and has integral ears 49, Fig. 7, extending therefrom. The ears 49 are adapted to grip the handle 41. The ring 48 of the securing member 47 is provided with a plurality of holes 50. The holes 50 are adapted to be brought into alignment so that the member 47 may be locked to the guard 1 by the fasteners 22, 25, 32 and 29.

The device consists of an inexpensive guard or protector to shield the hand of the operator of a welding machine. The device is preferably made from a blank cut from a single sheet of material and then configurated so as to be bent or folded along certain lines to form a gauntlet type shield or hand protector. One side of the protector extends downwardly a predetermined distance below the opposite side so as to protect that part of the operator's hand which is closest to the work. More particularly, the elongated side is adapted to cover the thumb of the operator, as the operator uses his thumb to operate the switch or control of the welding apparatus. The other side is somewhat shortened but extends a predetermined distance below the outer side of the right hand. The front of the device is relatively straight and flares upwardly and outwardly from the front end so that the back of the operator's hand as well as his fingers are adequately protected. The outer peripheral edge 51 of the device is smooth and arcuate, forming a substantially reverse or sinusoidal curve from one side of the opening 36 completely thereabouts to the opposite side of the opening 36. The device may be readily assembled, can be stamped or cut from sheets of insulating or heat resisting material such as a fiber. The particular formation of the device is important in that it shields the thumb of the operator, permitting a certain amount of free movement without subjecting the operator's hand to the extreme heat. The lower side wall 6 of the device protects adequately the opposite side of the operator's hand. The top 4 completely shields the operator's hand at the top thereof and while the bottom is open, the hand is still fully protected. Instead of making the device from a blank and folding the same, it may be molded if desired. The forming of the device from a blank as herein described is preferable, however, in that it permits the device to be manufactured and assembled at an extremely low cost. The description and operation of the device relates to a shield which is adapted to be used by a right handed person; however, the device may be folded in an opposite manner so as to be worn easily by a left handed operator.

The operator of a machine or device such as a welding machine generally wears gloves; but even so, the heat from the welding apparatus is so hot that in many instances the gloves of the operator become scorched. The specification refers to shielding the hand of the operator and the shield is so designed that the hand of the operator is protected whether or not he wears gloves.

Changes may be made in the form, construction and arrangement of the parts without departing from the spirit of the invention and without sacrificing any of its advantages, and the right is hereby reserved to make such changes as fall clearly within the scope of the following claims.

The invention is hereby claimed as follows:

1. A hand shield adapted to be carried by a part of a welding apparatus comprising a body having an open back and bottom to permit free movement of the operator's hand and wrist, with a relatively straight front portion, integral side walls and an integral top wall extending rearwardly and outwardly from said front portion, there being an opening in said front portion to permit the guard to be mounted on a handle of a welding apparatus, and fastening means adjacent said opening to secure the guard to an operating part of the welding apparatus.

2. A hand shield adapted to be carried by a part of a welding apparatus comprising a body having an open back and bottom to permit free movement of the operator's hand and wrist, with a relatively straight front portion, integral side walls and an integral top wall extending rearwardly and outwardly from said front portion, there being an opening in said front portion to permit the guard to be mounted on a handle of a welding apparatus, and fastening means adjacent said opening to secure the guard to an operating part of the welding apparatus, said fastening means comprising springy means secured to the front wall and adapted to engage resiliently the said part of the apparatus to permit easy application and removal of the guard to and from the apparatus.

3. An open bottom shield to protect the hands of an operator of a welding apparatus, said shield being made from a single blank of material configurated to provide a plurality of integral but separable parts, said parts being adapted to be brought into contacting relationship, said parts after being brought into contacting relationship being locked together by securing means and forming an enclosure constituting a front wall, an integral top and integral side walls, said front wall having an opening therein to receive the handle of a welding apparatus and fastening means secured to the shield to secure detachably said shield to said apparatus, said fastening means comprising a spring clip adjacent the opening in the shield to permit the shield to be connectedly detached.

4. A shield to protect the hands of an operator of a welding apparatus, said shield having an open back and bottom and being made from a single blank of insulating material configurated to provide a plurality of integral but separable parts, said parts being adapted to be brought into contacting relationship, said parts having holes therein which register in alignment when the parts are brought into contacting relationship, fastening means passing through aligned holes, said parts when secured together by said fastening means forming a shield having a front, a rearwardly extending top and side walls integral with the top and front, said front having an opening therein to permit the shield to be mounted on a part of a welding apparatus.

5. An open bottom shield to protect the hands of an operator of a welding apparatus, said shield being made from a single blank of material configurated to provide a plurality of integral but separable parts, said parts being adapted to be brought into contacting relationship, said parts having holes therein which register in alignment when the parts are brought into contacting relationship, fastening means passing through aligned holes, said parts when secured together by said fastening means forming a shield having a front, a rearwardly extending top and side walls integral with the top and front, said front having an opening therein to permit the shield to be mounted on a part of a welding apparatus and fastening means on the shield adjacent said opening to permit the shield to be attached to and detached from the apparatus.

JOHN J. SANDRIK.

REFERENCES CITED

The following references are of record in the file of this patent:

UNITED STATES PATENTS

| Number | Name | Date |
|---|---|---|
| 2,132,570 | Leone | Oct. 11, 1938 |
| 2,337,767 | Paul | Dec. 28, 1943 |